United States Patent
Yamamura et al.

(10) Patent No.: US 10,222,797 B2
(45) Date of Patent: Mar. 5, 2019

(54) CONTROL APPARATUS FOR AUTONOMOUSLY NAVIGATING UTILITY VEHICLE

(71) Applicant: Honda Motor Co., Ltd., Tokyo (JP)

(72) Inventors: Makoto Yamamura, Wako (JP); Toshiaki Kawakami, Wako (JP)

(73) Assignee: Honda Motor Co., Ltd., Boulder, CO (US)

( * ) Notice: Subject to any disclaimer, the term of this patent is extended or adjusted under 35 U.S.C. 154(b) by 0 days.

(21) Appl. No.: 15/080,054

(22) Filed: Mar. 24, 2016

(65) Prior Publication Data

US 2016/0282866 A1 Sep. 29, 2016

(30) Foreign Application Priority Data

Mar. 27, 2015 (JP) .................................. 2015-067215

(51) Int. Cl.
| | | |
|---|---|---|
| *G05D 1/00* | (2006.01) | |
| *G05D 1/02* | (2006.01) | |
| *A01D 34/00* | (2006.01) | |

(52) U.S. Cl.
CPC ......... *G05D 1/0088* (2013.01); *A01D 34/008* (2013.01); *G05D 1/0265* (2013.01); *G05D 1/0274* (2013.01); *G05D 1/0278* (2013.01); *G05D 2201/0208* (2013.01)

(58) Field of Classification Search
None
See application file for complete search history.

(56) References Cited

U.S. PATENT DOCUMENTS

| | | | |
|---|---|---|---|
| 2012/0265391 A1* | 10/2012 | Letsky ................. | A01D 34/008 701/25 |
| 2013/0006419 A1* | 1/2013 | Bergstrom ........... | A01D 34/008 700/245 |
| 2013/0024025 A1 | 1/2013 | Hsu | |
| 2013/0041526 A1 | 2/2013 | Ouyang | |
| 2015/0212500 A1 | 7/2015 | Akabane et al. | |
| 2016/0174459 A1* | 6/2016 | Balutis ................. | B25J 9/0081 701/25 |
| 2017/0168501 A1* | 6/2017 | Ogura ................. | G05D 1/0278 |

FOREIGN PATENT DOCUMENTS

| | | |
|---|---|---|
| JP | 2013164743 A | 8/2013 |
| WO | 2014058358 A1 | 4/2014 |

* cited by examiner

*Primary Examiner* — Lail A Kleinman
(74) *Attorney, Agent, or Firm* — Duft & Bornsen, PC

(57) ABSTRACT

In an apparatus for controlling operation of an autonomously navigating utility vehicle equipped with a prime mover to travel about a working area delineated by a boundary wire laid thereat in order to perform work autonomously, there are provided with a working region establishing unit that divides the working area into multiple regions by an imaginary boundary line designated by an operator and establishes a preferential working region in the working area, and a travel controlling unit that controls operation of the prime mover to make the vehicle travel autonomously in the preferential working region, discriminates whether the vehicle has reached the imaginary boundary line based on a detected vehicle position detector, and when the vehicle has reached the imaginary boundary line, controlling operation of the prime mover to make the vehicle turn toward inside of the preferential working region.

9 Claims, 9 Drawing Sheets

CONTROL APPARATUS FOR AUTONOMOUSLY NAVIGATING UTILITY VEHICLE

CROSS-REFERENCE TO RELATED APPLICATION

This application is based upon and claims the benefit of priority from Japanese Patent Application No. 2015-067215 filed on Mar. 27, 2015, the contents of which are incorporated herein by reference.

BACKGROUND OF THE INVENTION

Field of the Invention

This invention relates to a control apparatus for an autonomously navigating utility vehicle that autonomously navigates and performs lawn mowing and/or other tasks in a working area.

Description of Related Art

Among conventional control apparatuses for such an autonomously navigating utility vehicle are known control apparatuses that enable a working area delineated by a boundary wire to be divided into multiple areas (see Japanese Laid-Open Patent Application No. 2013-164743, for example). The control apparatus described in this reference enables the working area to be divided into multiple regions by folding back the boundary wire at arbitrary positions spaced at predetermined intervals to form fold regions and prohibiting the utility vehicle from passing through the fold regions when traveling to carry out work.

However, division of the working area is not easy with the control apparatus of the reference because the division of the working area into multiple regions requires the boundary wire to be folded back.

SUMMARY OF THE INVENTION

According to an aspect of the invention, there is provided an apparatus for controlling operation of an autonomously navigating utility vehicle equipped with a prime mover to travel about a working area delineated by a boundary wire laid thereat in order to perform work autonomously, comprising: a working region establishing unit that divides the working area into multiple regions by an imaginary boundary line designated by an operator and establishes a preferential working region among the divided regions in the working area; a position detector that produces an output indicating a position of the vehicle; and a travel controlling unit that controls operation of the prime mover to make the vehicle travel autonomously in the preferential working region established by the working region establishing unit, the travel controlling unit discriminating whether the vehicle has reached the imaginary boundary line based on the output of the position detector, and when it is discriminated that the vehicle has reached the imaginary boundary line, controlling operation of the prime mover to make the vehicle turn toward inside of the preferential working region.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
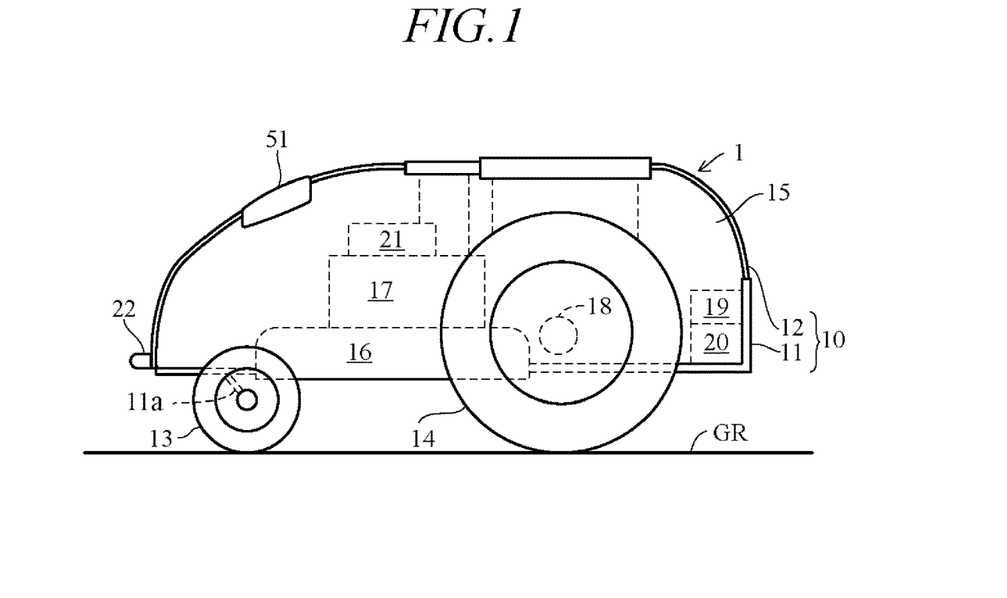
FIG. 1 is a side view schematically illustrating configuration of an autonomously navigating utility vehicle according to an embodiment of this invention.

An embodiment of the present invention is explained with reference to FIGS. 1 to 10 in the following. FIG. 1 is a side view schematically illustrating the configuration of an autonomously navigating utility vehicle according to an embodiment of the present invention, and FIG. 2 is plan view of the same.

The autonomously navigating utility vehicle of the present invention can be embodied in the form of various types of utility vehicle and particularly as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

Figure 2:
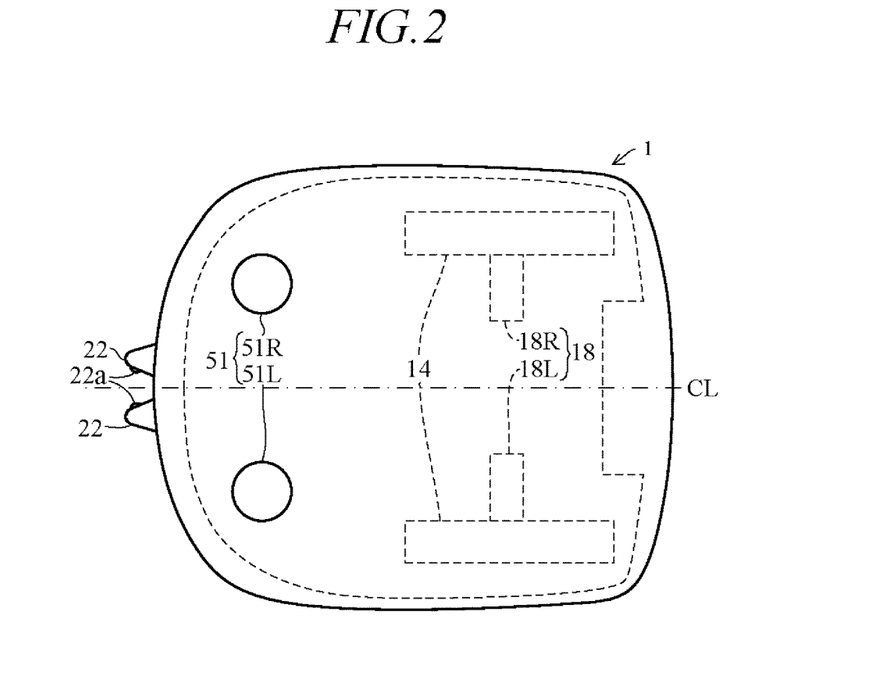
FIG. 2 is a plan view schematically illustrating the configuration of the utility vehicle according to the embodiment.

As shown in FIGS. 1 and 2, an autonomously navigating utility vehicle (hereinafter called simply "vehicle") 1 is equipped with a body 10 having a chassis 11 and a frame 12, along with a pair of left and right front wheels 13 and a pair of left and right rear wheels 14 that support the body 10 above a ground surface GR so as to be capable of travel.

The front wheels 13 are rotatably fastened through stays 11a to the front side of the chassis 11. The rear wheels 14, which are greater in diameter than the front wheels 13, are rotatably fastened directly to the rear end of the chassis 11. The weight and size of the vehicle 1 are such that it can be transported by an operator. As an example can be cited a vehicle 1 whose total length (forward-rearward direction length) is about 500 mm, total width about 300 mm, and height about 300 mm.

A work unit 16, a work motor 17 for driving the work unit 16, travel motors (prime mover) 18 for driving the rear wheels 14, a battery charging unit 19, a battery 20 and a housing box 30 are deployed in an internal space 15 of the vehicle 1 enclosed by the chassis 11 and the frame 12.

The work unit 16 comprises a rotor and blades attached to the rotor and has a substantially disk-like shape as a whole. A rotating shaft is installed vertically at the center of the rotor and the work unit 16 is configured to enable adjustment of the height of the blades above the ground GR through a height regulating mechanism 21 by the operator. The height regulating mechanism 21 is equipped with, for example, a screw operable by the operator. The work motor 17 is constituted by an electric motor installed above the work unit 16, and an output shaft thereof is connected to the rotating shaft of the rotor to rotate the blades unitarily with the rotor.

The travel motors 18 comprise a pair of electric motors 18L and 18R installed on the right and left inner sides of the left and right rear wheels 14. Output shafts of the travel motors 18L and 18R are connected to rotating shafts of the left and right rear wheels 14, respectively, so as each to independently drive or rotate the left or right rear wheel 14. In other words, the vehicle 1 comprises the front wheels 13 as non-driven free wheels and the rear wheels 14 as driving wheels, and the travel motors 18L and 18R each independently rotates one of the rear wheels 14 normally (rotation to move forward) or reversely (rotation to move reverse). By establishing a difference between the rotating speeds of the left and right rear wheels 14, the vehicle 1 can be turned to an arbitrary direction.

For example, when the left and right rear wheels 14 are both rotated normally and the rotational speed of the right rear wheel 14 is greater than the rotational speed of the left rear wheel 14, the vehicle 1 turns left at a turning angle $\theta$ in accordance with the speed difference. Conversely, when the rotational speed of the left rear wheel 14 is greater than the rotational speed of the right rear wheel 14, the vehicle 1 turns right at a turning angle $\theta$ in accordance with the speed difference. When one of the left and right rear wheels 14 is rotated normally and the other reversely both at the same speed, the vehicle 1 turns on the spot.

The charging unit 19, which includes an AC-DC converter, is connected by wires to charging terminals 22 provided at the front end of the frame 12 and is also connected by wires to the battery 20. The charging terminals 22 have contacts 22a, and the battery 20 can be charged by connecting the charging terminals 22 through the contacts 22a to a charging station 3 (see FIG. 5). The battery 20 is connected through wires to the work motor 17 and the travel motors 18, and the work motor 17 and the travel motors 18 are driven by power supplied from the battery 20 through drivers.

Figure 3:
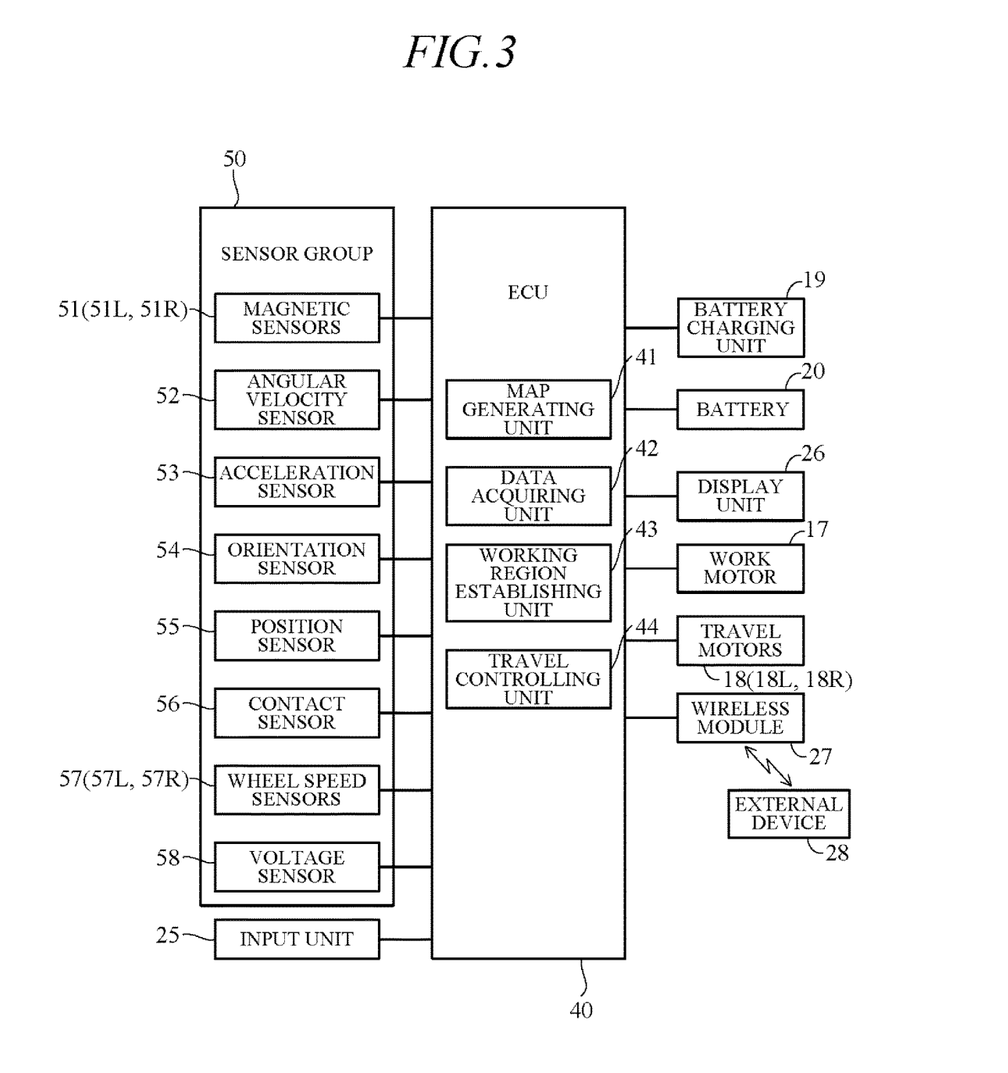
FIG. 3 is a block diagram showing the configuration of a control apparatus of the utility vehicle according to the present embodiment including an ECU.

FIG. 3 is a block diagram showing the configuration of the control apparatus of the vehicle 1 according to the present embodiment. As shown in FIG. 3, an Electronic Control Unit (ECU) 40 is mounted on the vehicle 1. The ECU 40 has a microcomputer of a configuration including an arithmetic processing unit (CPU) and memories ROM, RAM and other peripheral circuits.

The ECU 40 is connected with a group of sensors collectively designated by reference numeral 50 that detects various conditions of the vehicle 1, charging unit 19, battery 20, input unit 25, display unit 26, work motor 17, travel motors 18 (18R, 18L) and wireless module 27. The group of sensors 50 includes a pair of magnetic sensors 51 (51R, 51L), an angular velocity sensor (turning angle sensor) 52, an acceleration sensor 53, an orientation sensor 54, a position sensor 55, a contact sensor 56, a pair of wheel speed sensors 57 (57R, 57L), and a voltage sensor 58.

The magnetic sensors 51, i.e., 51R and 51L are installed laterally spaced apart on the front side of the vehicle 1. More specifically, as shown in FIG. 2, the magnetic sensors 51R and 51L are installed laterally symmetrically with respect to a center line CL running in the straight forward direction along the widthwise center of the vehicle 1. The magnetic sensors 51 produces an output indicating magnitude of magnetic field (magnetic field strength (intensity) H).

The angular velocity sensor 52 produces an output indicating angular velocity (yaw rate) occurring around a height direction (z-axis) of the vehicle 1, from which a turning angle $\theta$ of the vehicle 1 around the z-axis can be calculated.

The acceleration sensor 53 produces an output indicating acceleration acting on the vehicle 1 in the directions of three orthogonal axes (x-axis, y-axis, and z-axis).

The orientation sensor 54 comprises a geomagnetic sensor of 2-axis or 3-axis structure that produces an output indicating geomagnetism, from which an orientation of the vehicle 1 relative to a reference orientation (e.g., north) can be detected.

The position sensor 55 is constituted as a GPS sensor and produces an output indicating the position (self-position) of the vehicle 1 in longitude and latitude by receiving radio waves transmitted from GPS satellites. The contact sensor 56 produces an output of ON signal when the frame 12 is detached from the chassis 11 owing to contact with an obstacle or the like. Each of the pair of wheel speed sensors 57R, 57L produces an output indicating wheel speed of one of the left and right rear wheels 14, from which a travel distance of the vehicle 1 can be calculated. The voltage sensor 58 produces an output indicating a residual voltage of the battery 20.

The input unit 25 has devices such as numeric keypad, cursor key, switches, etc., provided to be manipulatable by the operator. The switches includes a main switch for inputting various commands, inter alia, start of vehicle 1 operation, and an emergency stop switch for stopping the vehicle 1 in an emergency.

The display unit 26 has a display that shows various information to be supplied to the operator, so that the operator can input commands through the devices of the input unit 25 based on the information shown at the display unit 26. The input unit 25 and display unit 26 may be constituted by a touch panel.

Figure 4:
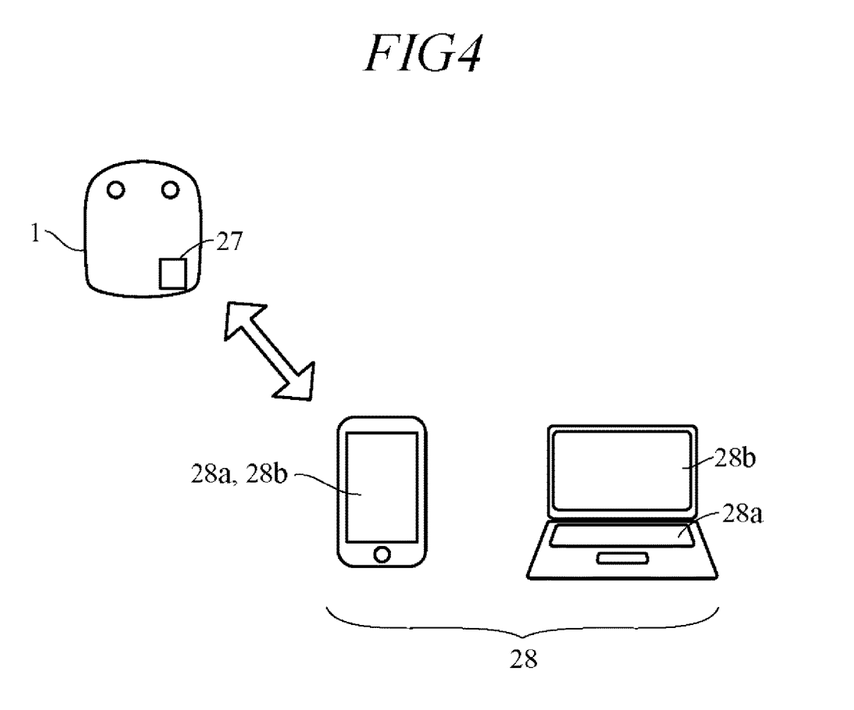
FIG. 4 is a diagram showing an example of an external device that communicates with the ECU shown in FIG. 3.

The wireless module 27 has a transceiver antenna and a signal processing circuit that processes signals transmitted/sent through the antenna. The ECU 40 is connected to an external device 28 (provided exterior to the vehicle 1) through the wireless module 27. FIG. 4 shows an example of the external device 28. As shown, the external device 28 may be a mobile telephone terminal or personal computer each having an input unit 28a and a display 28b.

Figure 5:
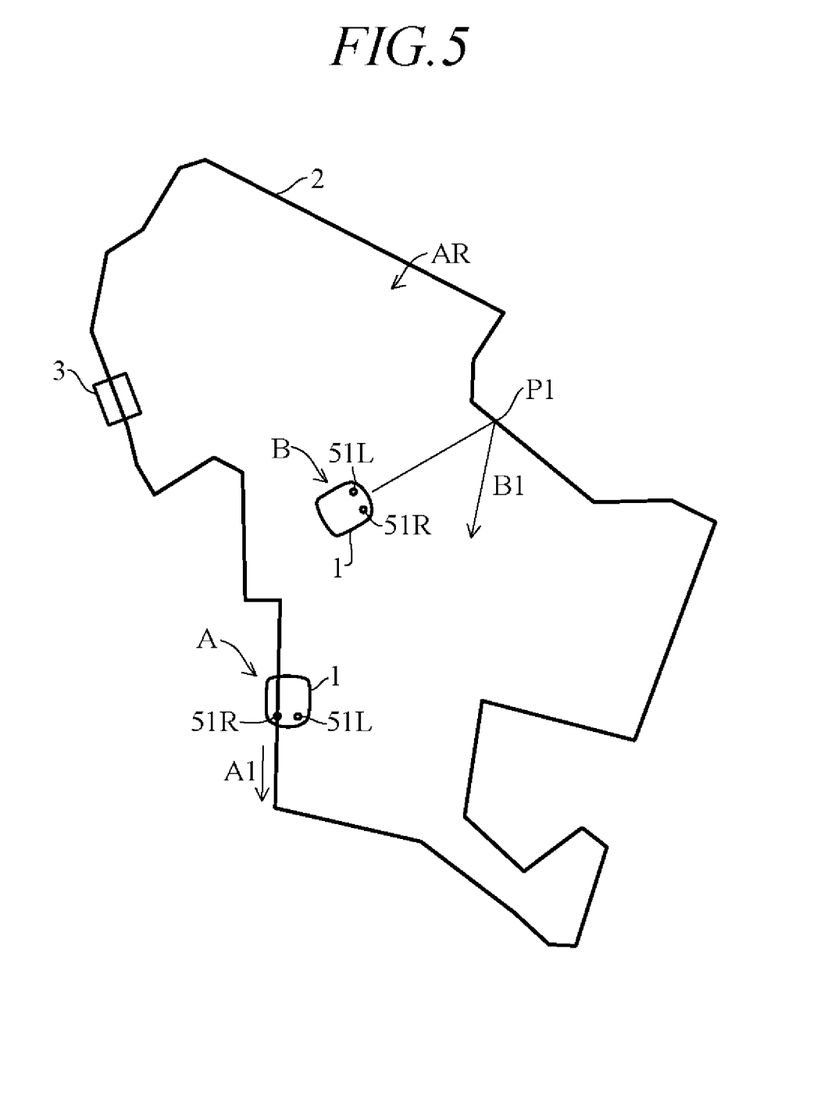
FIG. 5 is a diagram showing an example of a working area to be serviced by the utility vehicle shown in FIG. 1.

The vehicle 1 configured as described above performs a task while autonomously navigating within a predefined working area. FIG. 5 is a diagram showing an example of a working area AR. The working area AR is, for example, delineated by a boundary wire 2 laid beforehand (e.g., buried a predetermined depth under the ground surface GR). The boundary wire 2 is laid so as not to enclose buildings, obstacles and the like on the site. A magnetic field is generated in the working area AR by passing electric current through the boundary wire 2. The charging station 3 for charging the battery 20 is situated above the boundary wire 2. The working area AR defines the travel range of the vehicle 1 and may include not only area(s) to be serviced but also area(s) not to be serviced.

Figure 6:
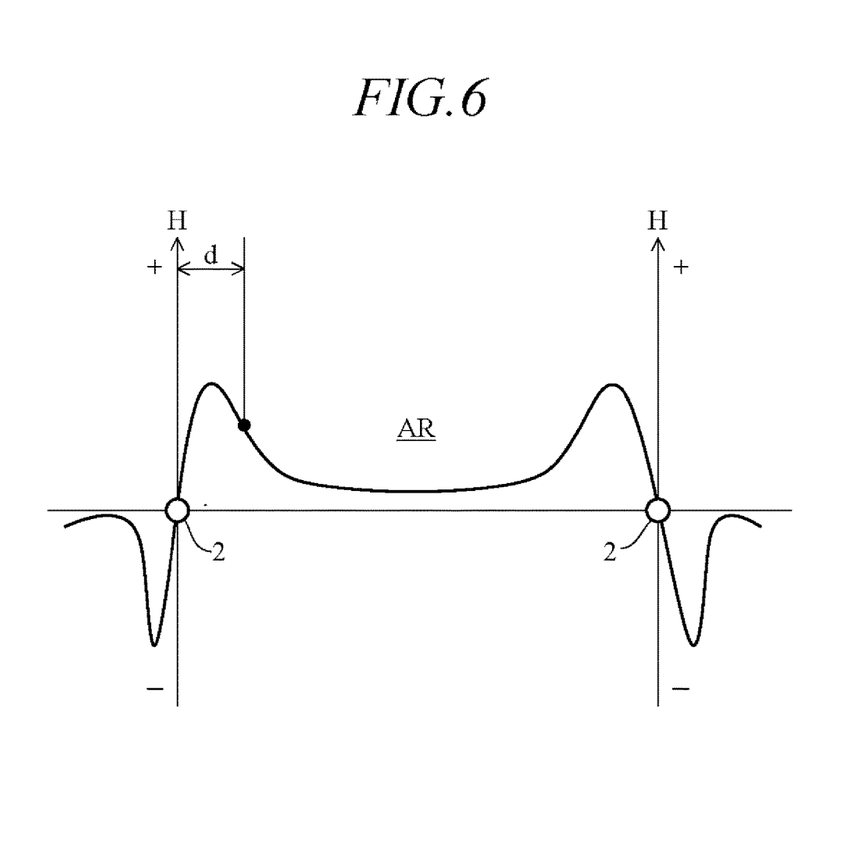
FIG. 6 is a diagram showing relation between distance from the boundary wire and magnetic field strength.

FIG. 6 is a diagram showing relation between distance d from the boundary wire 2 and magnetic field strength H. As indicated in FIG. 6, magnetic field strength H varies with distance d from the boundary wire 2. Specifically, magnetic field strength H is 0 above the boundary wire 2, positive inside the working area AR, and negative outside the same.

When work is in progress, the ECU 40 reads outputs of the magnetic sensors 51L and 51R, and when the output is minus, turns the vehicle 1 toward inside the working area AR at a random angle based on, for example, the output of the angular velocity sensor 52. As a result, work can be carried out inside the working area AR while the vehicle 1 is being driven (forward at random, for example).

In the present embodiment, the vehicle 1 operates in work mode, trace mode and return mode in response to control commands sent from the ECU 40 in accordance with programs prepared beforehand and memorized in the memory (ROM). In work mode, the vehicle 1 works (mows lawn or grass) while autonomously navigating in the working area AR. In return mode, the vehicle 1 is returned to the charging station 3 when residual voltage of the battery 20 detected by the voltage sensor 58 falls to or below a predetermined value and the battery 20 requires charging. In trace mode, the vehicle 1 is driven along the boundary wire 2. Trace mode is executed before work mode to ascertain the working area AR.

As shown at A in FIG. 5, in trace mode the vehicle 1 is driven by commands from the ECU 40 to circuit along the boundary wire 2 with one of the pair of magnetic sensors 51R and 51L (e.g., 51L) positioned inside the boundary wire 2 and so that the other magnetic sensor (e.g., 51R) moves above the boundary wire 2 in the direction of arrow A1. Specifically, the ECU 40 monitors output of the magnetic sensor 51R and controls the travel motors 18L and 18R so that magnetic field strength H detected by the magnetic sensor 51R stays at 0.

For example, when magnetic field strength H detected by the magnetic sensor 51R becomes positive, the vehicle 1 is turned rightward by decelerating right travel motor 18R and accelerating left travel motor 18L. On the other hand, when magnetic field strength H detected by the magnetic sensor 51R becomes negative, the vehicle 1 is turned leftward by accelerating the right travel motor 18R and decelerating the left travel motor 18L. As a result, the right magnetic sensor 51R is brought near the boundary wire 2 and magnetic field strength H detected by the right magnetic sensor 51R is maintained at 0.

Trace mode is started from a state in which the charging terminals 22 of the vehicle 1 are connected to connection terminals of the charging station 3 and ends when the charging terminals 22 again connect to the connection terminals after the vehicle 1 makes a circuit along the boundary wire 2. Position of the vehicle 1 from start to finish of trace mode travel is detected by the position sensor 55. Based on outputs from the position sensor 55, the ECU 40 identifies working area AR boundary line (L0 in FIG. 7) position coordinates with respect to the charging station 3 as a reference (origin).

In work mode, the vehicle 1 is driven forward in the working area AR. The forward-traveling vehicle, e.g., the vehicle 1 at B in FIG. 5, arrives at the boundary wire 2 at position P1. When arrival of the vehicle 1 at the boundary wire 2 is detected by the magnetic sensors 51, the vehicle 1 is turned toward inside of the working area AR as indicated by arrow B1. Thus the vehicle 1 is driven forward in the working area AR at random by repeating forward travel and turning in this manner.

In this regard, however, the operator may sometimes not want the vehicle 1 to service the working area AR thoroughly throughout but to service only a particular region within the working area AR preferentially. For example, lawn grows faster in sunny regions than in shady ones, so a sunny region may be designated a preferential working region and cases may arise in which it is desired to mow only the preferential working region. Moreover when mowing a home yard, an attractive front yard is particularly desired, so the front yard may be considered a preferential working region and only this preferential working region mowed. In such a case, it would be time-consuming and troublesome to establish the preferential working region by re-laying the boundary wire 2. So in the present embodiment, the preferential working region is established as explained in the following.

As shown in FIG. 3, the ECU 40 has as functional constituents a map generating unit 41, a data acquiring unit 42, a working region establishing unit 43, and a travel controlling unit 44.

In trace mode, the map generating unit 41 generates a map (mapped data) of the working area AR (working area map MP) based on the outputs of the position sensor 55 when the vehicle 1 is driven in trace mode. Travel by trace mode is required only once after laying the boundary wire 2 under the ground and the working area map MP obtained at this time is stored in the memory (RAM or ROM) of the ECU 40.

Figure 7:
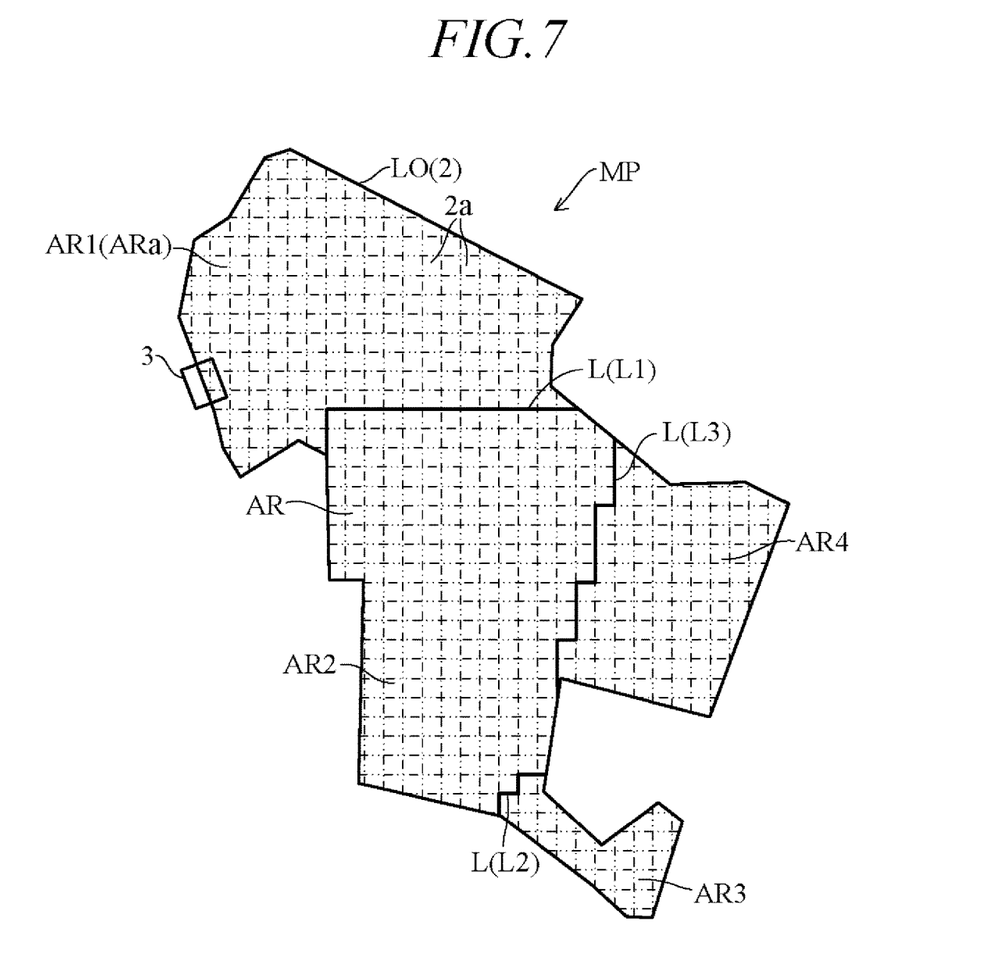
FIG. 7 is a diagram showing an example of a working area map generated by the ECU shown in FIG. 3.

FIG. 7 is a diagram showing an example of the working area map MP. In FIG. 7, the position of the boundary wire 2 on the working area map MP is represented by boundary line L0. The working area map MP is formed using position (latitude and longitude) of the boundary wire 2 detected by the position sensor 55 and position (latitude and longitude) of the charging station 3.

Specifically, position of the charging station 3 at the start of trace mode travel is taken as an origin and the working area AR inside boundary line L0 is divided grid-like at equal intervals on an orthogonal two-axis coordinate plane (XY plane) based on a predetermined direction defined by the orientation sensor 54. By this, multiple cells 2a are arrayed in the working area AR to form the working area map MP. Each cell 2a of the so-formed working area map MP has its own unique position coordinates (X coordinate and Y coordinate). Otherwise, rather than dividing the working area AR inside boundary line L0 at equal intervals, it is possible instead to define a predetermined position (e.g., position of the charging station 3) as an origin and form cells 2a at predetermined pitch in the X direction and the Y direction.

The map generating unit 41 transmits the generated working area map MP through the wireless module 27 to the external device 28. For example, when a map data requesting command is received from an authenticated external device 28, the map generating unit 41 controls the wireless module 27 to transmit data of the working area map MP to the external device 28. This enables display of the working area map MP of FIG. 7 on the display 28b of the external device 28. Alternatively, it is possible to show only the boundary line L0 of the working area map MP of FIG. 7 on the display 28b.

The operator uses the input unit 28a to draw an imaginary boundary line L at a desired location in the working area AR of the working area map MP shown on the display 28b. The imaginary boundary line L is drawn to follow boundary lines of cells 2a on the working area map MP. When the external device 28 is the mobile telephone terminal, the operator can draw the path of imaginary boundary line L by, for example, tracing it on the screen-displayed working area map MP. When the external device 28 is the personal computer, the operator can draw the path of imaginary boundary line L by, for example, designating it on the screen-displayed working area map MP by mouse manipulation or the like. The path of the imaginary boundary line L can also be designated by inputting coordinates.

Designation of the imaginary boundary line L makes it possible to divide the working area AR by means of the imaginary boundary line L. In the example of FIG. 7, multiple imaginary boundary lines L (L1, L2 and L3) are designated on the working area map MP. In addition, the operator can use the input unit 28a to select the preferential working region to be preferentially serviced from among the divided regions. The data acquiring unit 42 communicates through the wireless module 27 to acquire data on the imaginary boundary line(s) L and preferential working region designated by the operator.

The working region establishing unit 43 divides the working area AR on the working area map MP into multiple regions based on data acquired by the data acquiring unit 42. In addition, a region selected by the operator from among the divided multiple regions is designated a preferential working region ARa. Thus, as shown in FIG. 7, the working area AR on the working area map MP is divided into multiple regions AR1, AR2, AR3 and AR4 separated by the imaginary boundary lines L1, L2 and L3, and one of the divided regions (e.g., AR1) is established as the preferential working region ARa.

In work mode, the travel controlling unit 44 controls operation of the travel motors 18 to make the vehicle 1 travel straight forward at random inside the preferential working region ARa established by the working region establishing unit 43. More specifically, arrival of the vehicle 1 at the boundary wire 2 is discriminated from the outputs of the magnetic sensors 51 and when it is determined to have arrived at the boundary wire 2, the vehicle 1 is turned toward inside of the preferential working region ARa. Moreover, arrival of the vehicle 1 at an imaginary boundary line L is discriminated from the output of the position sensor 55 and when it is determined to have arrived at an imaginary boundary line L, the vehicle 1 is turned toward inside of the preferential working region ARa.

Figure 8:
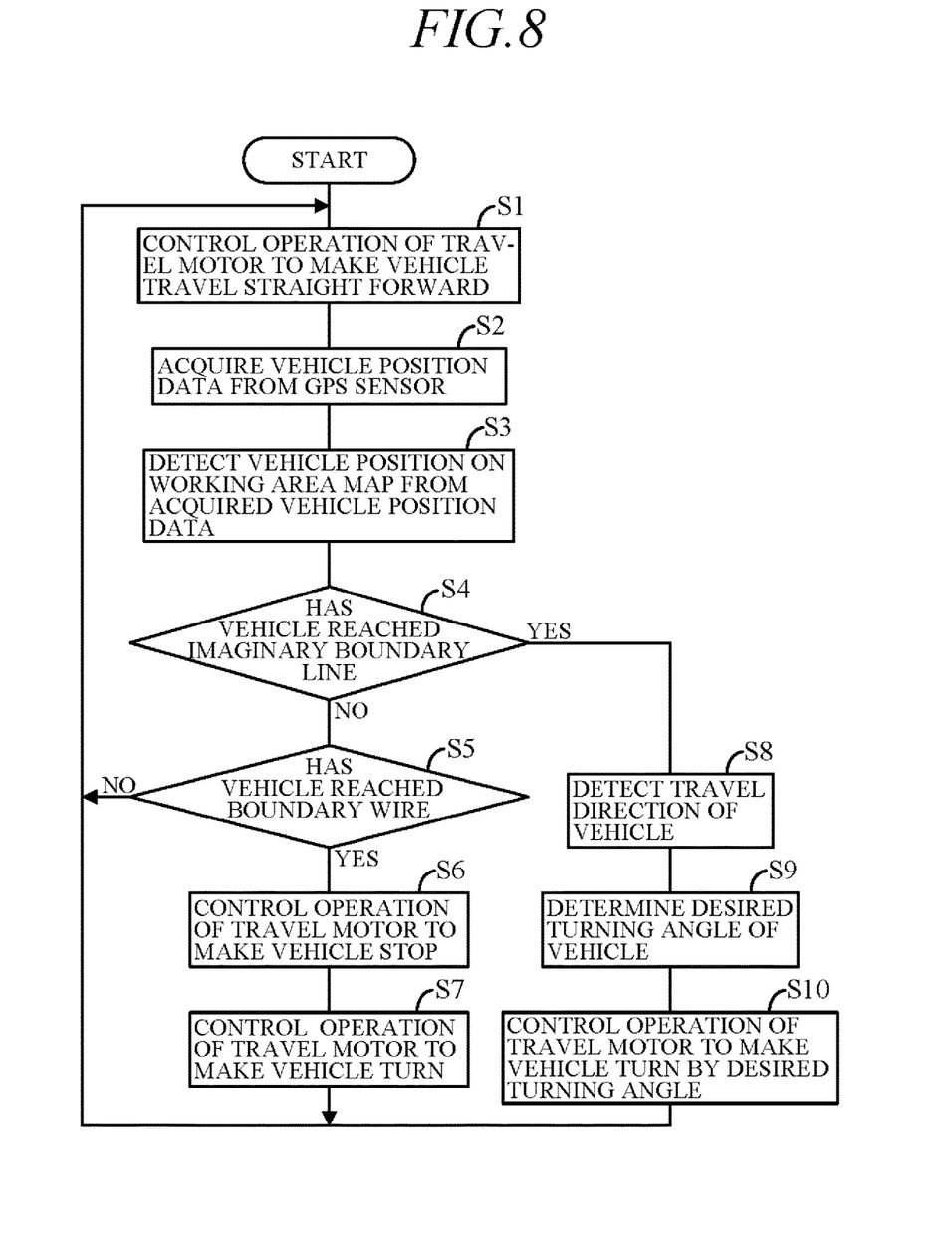
FIG. 8 is a flowchart showing an example of processing executed by the ECU shown FIG. 3.

FIG. 8 is a flowchart showing an example of processing executed in the ECU 40 in work mode, primarily an example of processing executed in the travel controlling unit 44. The processing shown in this flowchart is started after the preferential working region ARa is established by the working region establishing unit 43 and the vehicle 1 has been deployed in the preferential working region ARa in work mode. In the following, the preferential working region ARa is assumed to be established in the region AR1.

First, in S1, operation of the travel motors 18 is controlled by outputting control commands to the travel motors 18 to make the vehicle 1 travel straight forward in the preferential working region ARa (S: processing Step). Next, in S2, position data (latitude and longitude) of the vehicle 1 is acquired from the position sensor 55. Then, in S3, position of the vehicle 1 on the working area map MP is detected based on the position data acquired from the position sensor 55.

Next, in S4, it is discriminated whether the vehicle 1 has reached the imaginary boundary line L1 based on the outputs of the position sensor 55. When the result in S4 is NO, the program goes to S5, in which it is discriminated whether the vehicle 1 has reached the boundary wire 2 based on the outputs of the magnetic sensors 51.

When the result in S5 is YES, the program goes to S6, and when NO, returns to S1. In S6, operation of the travel motors 18 is controlled by outputting control commands to the travel motors 18 to make the vehicle 1 stop. Next, in S7, operation of the travel motors 18 is controlled by outputting control commands to the travel motors 18 to make the vehicle 1 turn toward inside of the working area AR (preferential working region ARa), whereafter the program returns to S1.

On the other hand, when the result in S4 is YES, the program goes to S8, in which travel direction of the vehicle 1 is detected from the output of the orientation sensor 54. Next, in S9, a desired turning direction of the vehicle 1 is determined.

Figure 9:
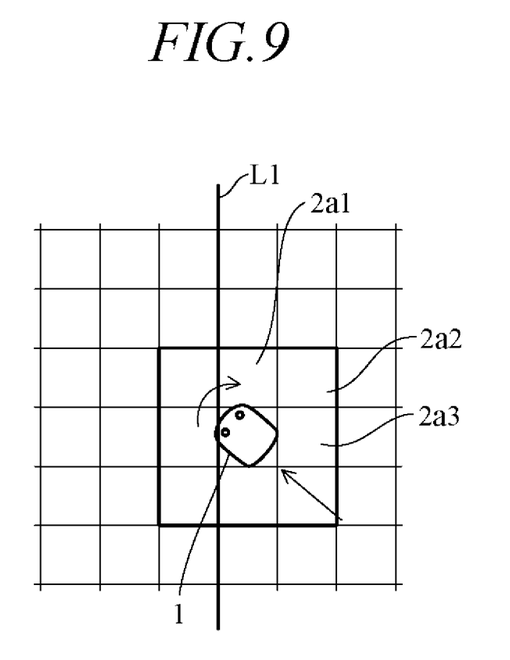
FIG. 9 is a diagram for explaining determination of a desired turning angle in the processing of FIG. 8.

FIG. 9 is a diagram for explaining a desired turning angle determination. When the vehicle 1 reaches the imaginary boundary line L1, the travel controlling unit 44 determines a desired turning angle for making the vehicle 1 pass through, among cells 2a surrounding the vehicle 1, namely, a block of eight cells 2a adjacent in forward, rearward, left, right and diagonal directions, one of the cells 2a1, 2a2 and 2a3 inside the preferential working region ARa and through which the vehicle 1 has not just passed.

Next, in S10, operation of the travel motors 18 is controlled by outputting control commands to the travel motors 18 to make the vehicle 1 turn by the desired turning angle, whereafter the program returns to S1. As a result, the vehicle 1 can be turned toward inside of the preferential working region ARa to carry out work in the preferential working region ARa.

Figure 10:
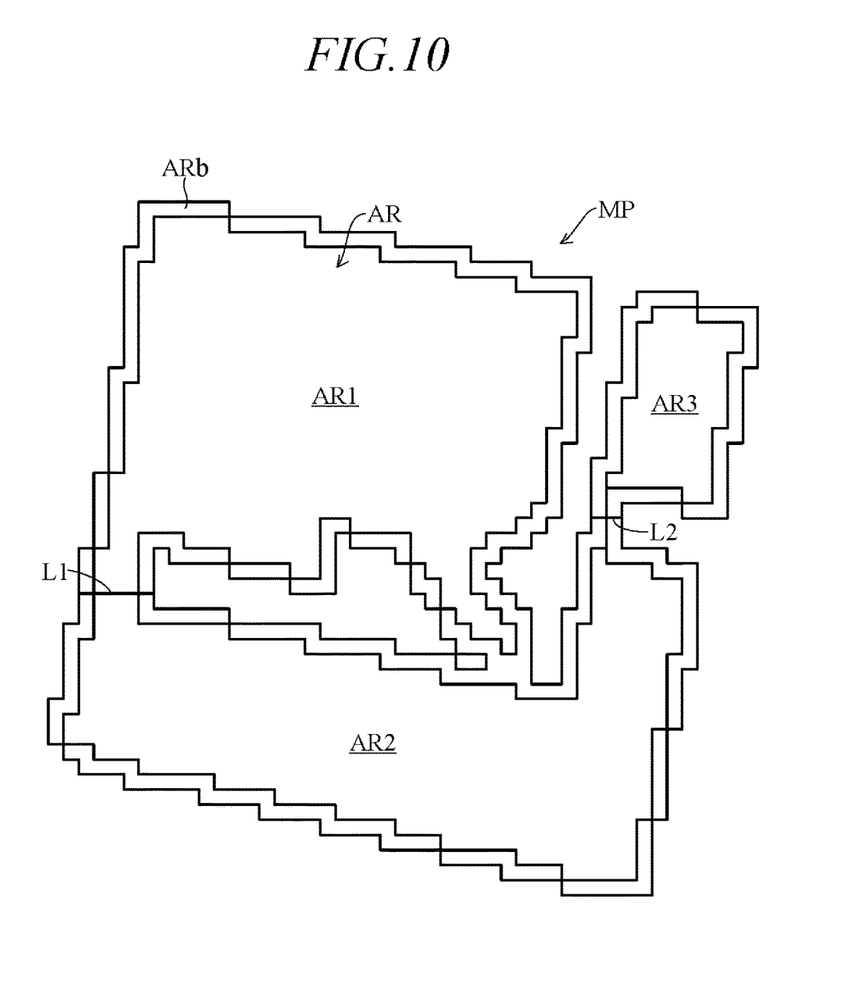
FIG. 10 is a diagram showing a modification of the map shown in FIG. 7.

FIG. 10 is a diagram showing a modification of FIG. 7. In this drawing, a region ARb of the boundary line L0 laid with the boundary wire 2 is illustrated in cell units. Boundary lines L1 and L2 are established in the working area AR, and the working area AR is divided into three regions AR1, AR2 and AR3 separated by the boundary lines L1 and L2. By designating one of these three regions AR1, AR2 and AR3 (e.g., region AR1) as the preferential working region (ARa), the vehicle 1 can travel and perform work without straying out of the preferential working region ARa. Therefore, one part of the working area AR can be preferentially serviced in line with the operator's wish to preferentially service a desired region AR1.

The present embodiment is configured to have an apparatus and method for controlling operation of an autonomously navigating utility vehicle (1) equipped with a prime mover (18) to travel about a working area (AR) delineated by a boundary wire (2) laid thereat in order to perform work autonomously, characterized by: a working region establishing unit (43) that divides the working area (AR) into multiple regions (ARn) by an imaginary boundary line (L) designated (beforehand) by an operator and establishes a preferential working region (ARa) among the divided regions in the working area (AR); a position detector (55) that produces an output indicating a position of the vehicle (1); and a travel controlling unit (44) that controls operation of the prime mover (18) to make the vehicle (1) travel autonomously in the preferential working region (ARa) established by the working region establishing unit (43), the travel controlling unit (44) discriminating whether the vehicle (1) has reached the imaginary boundary line (L) based on the output of the position detector (55), and when it is discriminated that the vehicle (1) has reached the imaginary boundary line (L), controlling operation of the prime mover (18) to make the vehicle (1) turn toward inside of the preferential working region ARa (S4-S10).

With this, the vehicle 1 can therefore carry out work (lawn or grass mowing) solely in one part of the working area AR designated by the operator. Specifically, the control apparatus for an autonomously navigating utility vehicle according to this embodiment has the working region establishing unit 43 that establishing the preferential working region ARa by dividing the working area AR into multiple regions separated by imaginary boundary lines L designated beforehand by the operator, so that the preferential working region ARa where work is to be performed preferentially can be easily established in one part of the working area AR, thereby making complicated work for establishing the preferential working region ARa unnecessary.

In the apparatus, the working region establishing unit (43) establishes the preferential working region (ARa) on a working area map (MP) comprised of an array of the multiple cells (2a).

With this, in addition to the advantages and effects mentioned above, designation of imaginary boundary lines L by the operator is made simple because imaginary boundary line(s) L need only to be designated on the working area map MP.

The apparatus and method further includes: an external device (28) provided exterior to the vehicle (1) for the operator to input data of designating the imaginary boundary line (L); and a data acquiring unit (42) that acquires the data of designating the imaginary boundary line (L) inputted by the external device (28); and the working region establishing unit (43) establishes the preferential working region (ARa) based on the data acquired by the data acquiring unit (42).

With this, in addition to the advantages and effects mentioned above, the operator can easily establish the preferential working region ARa at a desired location in the working area AR merely by inputting imaginary boundary line(s) L using the external device 28.

The apparatus and method further includes: a magnetic sensor (40) that is installed on the vehicle (1) and produces an output indicating a magnetic field strength (H) generated by electric current passing through the boundary wire (2); and the travel controlling unit (44) discriminates whether the vehicle (1) has reached the boundary wire (2) based on the output (H) of the magnetic sensors (51), and controls operation of the prime mover (18) to make the vehicle (1) turn toward inside the preferential working region (ARa) when it is discriminated that the vehicle (1) has reached the boundary wire 2 (S4-S7).

With this, in addition to the advantages and effects mentioned above, the vehicle 1 can perform work without straying out of the preferential working region ARa even when the preferential working region ARa is partially delineated by the boundary wire 2.

The apparatus and method further includes: a map generating unit (41) that generates the working area map (MP) based on the outputs of the position sensor (55) when the vehicle (1) travels in the working area (AR) and transmits the generated working area map (MP) to the external device (28) (through a wireless module (27)).

With this, in addition to the advantages and effects mentioned above, the working area map MP can be displayed on the display 28b of the external device 28, so that imaginary boundary line(s) L can be easily designated on the working area map MP via the external device 28.

Although the present embodiment is configured such that the ECU 40 is connected to the external device 28 through the wireless module 27 to be communicatable with each other, the ECU 40 may be connected to the external device 28 through a wire module. More specifically, if the generated working area map MP can be transmitted from the ECU 40 to the external device 28 or the data of designating the imaginary boundary line L can be transmitted from the external device (28) to the ECU 40 through any module, the module can be of any type.

Alternatively, the present embodiment may be configured such that the generated working area map MP is displayed in the display unit 26, or the operator designates the imaginary boundary line L through the input unit 25.

Although the present embodiment is configured such that the preferential working region ARa is established by the boundary wire 2 and imaginary boundary line L by surrounding the area ARa by them as shown in FIGS. 7 and 10, the area ARa may be established by the imaginary boundary line L.

Although the present embodiment is configured such that the vehicle 1 is driven by the prime mover comprising a pair of travel motors 18L, 18R, it may be configured such that the vehicle 1 can be driven by other prime mover such as an internal combustion engine.

Although the present embodiment is configured such that the a pair of magnetic sensors 51L, 51R are installed, the sensor 51 may be a single one.

It should be noted in the above that, although the present embodiment is applied for a lawn mower for lawn or grass mowing work, it may applied to any other type of utility vehicle.

It should also be noted that the above embodiment and one or more of the modifications can be freely combined.

While the present invention has been described with reference to the preferred embodiments thereof, it will be understood, by those skilled in the art, that various changes and modifications may be made thereto without departing from the scope of the appended claims.

What is claimed is:

1. An apparatus for controlling operation of an autonomously navigating utility vehicle equipped with a prime mover to travel about a working area delineated by a working area boundary line in order to perform work autonomously, the apparatus comprising:
    a working area boundary line detector that produces an output indicating the working area boundary line;
    a position detector that produces an output indicating a position of the vehicle; and
    a processor that operates in a trace mode executed before a work mode to circuit the vehicle along the working area boundary line based on the output from the working area boundary line detector, to detect the position of the vehicle based on the output from the position detector from start to finish of the trace mode, and to generate a map of the working area based on the output of the position detector when the vehicle is driven in the trace mode;
    wherein the processor transmits the map to an external device through a wireless transceiver, acquires data from the external device through the wireless transceiver indicating an imaginary boundary line designated by an operator of the external device that divides the working area into multiple regions to be serviced by the vehicle, and acquires data from the external device through the wireless transceiver indicating a preferential working region among the multiple regions at a location irrespective of a travelling direction of the vehicle;
    wherein the processor operates in the work mode to discriminate whether the vehicle has reached the working area boundary line based on the output of the working area boundary line detector, and to control operation of the prime mover to make the vehicle turn toward the inside of the working area when it is discriminated that the vehicle has reached the working area boundary line;
    wherein the processor operates in the work mode to control operation of the prime mover to make the vehicle travel autonomously only in the preferential working region by discriminating whether the vehicle has reached the imaginary boundary line based on the output of the position detector, and controlling operation of the prime mover to make the vehicle turn toward the inside of the preferential working region when it is discriminated that the vehicle has reached the imaginary boundary line.

2. The apparatus according to claim 1, wherein the processor establishes the preferential working region on the map comprised of an array of the multiple cells.

3. The apparatus according to claim 2, wherein:
the imaginary boundary line follows cell boundary lines of the cells on the map.

4. The apparatus according to claim 1, further including:
the external device that comprises an input unit and a display;
wherein the display is configured to display the map of the working area to the operator;
wherein the input unit is configured to allow the operator to draw the imaginary boundary line on the map shown on the display to divide the working area into the multiple regions to be serviced by the vehicle;
wherein the input unit is configured to allow the operator to select the preferential working region from the multiple regions displayed on the map.

5. A method for controlling operation of an autonomously navigating utility vehicle equipped with a prime mover to travel about a working area delineated by a working area boundary line in order to perform work autonomously, comprising the steps of:
circuiting the vehicle along the working area boundary line in a trace mode executed before a work mode;
detecting a position of the vehicle based on output from a position detector from start to finish of the trace mode;
generating a map of the working area based on the output of the position sensor when the vehicle is driven in the trace mode;
transmitting the map to an external device through a wireless transceiver on the vehicle;
acquiring data from the external device through the wireless transceiver indicating an imaginary boundary line designated by an operator of the external device that divides the working area into multiple regions to be serviced by the vehicle;
acquiring data from the external device through the wireless transceiver indicating a preferential working region among the multiple regions at a location irrespective of a travelling direction of the vehicle;
controlling operation of the prime mover in the work mode further comprises discriminating whether the vehicle has reached the working area boundary line, and controlling operation of the prime mover to make the vehicle turn toward the inside of the working area when it is discriminated that the vehicle has reached the working area boundary line; and
controlling operation of the prime mover in the work mode to make the vehicle travel autonomously only in the preferential working region by discriminating whether the vehicle has reached the imaginary boundary line based on the detected position, and controlling operation of the prime mover to make the vehicle turn toward the inside of the preferential working region when it is discriminated that the vehicle has reached the imaginary boundary line.

6. The method according to claim 5, wherein acquiring the data indicating the preferential working region comprises acquiring the data indicating the preferential working region on the map comprised of an array of the multiple cells.

7. The method according to claim 6, wherein:
the imaginary boundary line follows cell boundary lines of the cells on the map.

8. The method according to claim 5, further including:
displaying, at the external device, the map of the working area to the operator;
receiving, at the external device, a drawing by the operator of the imaginary boundary line on the map displayed to the operator that divides the working area into the multiple regions to be serviced by the vehicle; and
receiving, at the external device, a selection by the operator of the preferential working region from the multiple regions displayed on the map.

9. An autonomously navigating utility vehicle equipped with a prime mover to travel about a working area delineated by a working area boundary line in order to perform work autonomously, the vehicle comprising:
a working area boundary line detector that produces output indicating the working area boundary line;
a position detector that produces output indicating a position of the vehicle;
a wireless transceiver that connects to an external device through an antenna; and
a processor that drives the vehicle along the working area boundary line in a trace mode executed before a work mode based on the output from the working area boundary line detector, and generates a map of the working area based on the output from the position detector as the vehicle is driven to circuit along the working area boundary line in the trace mode;
the processor transmits the map to the external device through the wireless transceiver, acquires data from the external device through the wireless transceiver indicating an imaginary boundary line designated by an operator of the external device that divides the working area into multiple regions to be serviced by the vehicle, and acquires data from the external device through the wireless transceiver indicating a preferential working region among the multiple regions at a location irrespective of a travelling direction of the vehicle;
the processor controls operation of the prime mover in the work mode to make the vehicle travel autonomously in the working area by discriminating whether the vehicle has reached the working area boundary line based on the output from the working area boundary line detector, and turning the vehicle toward the inside of the working area when the vehicle has reached the working area boundary line;
the processor controls operation of the prime mover in the work mode to make the vehicle travel autonomously only in the preferential working region by discriminating whether the vehicle has reached the imaginary boundary line based on the output from the position detector, and turning the vehicle toward the inside of the preferential working region when the vehicle has reached the imaginary boundary line.

* * * * *